US011063517B2

(12) United States Patent
Lin et al.

(10) Patent No.: US 11,063,517 B2
(45) Date of Patent: Jul. 13, 2021

(54) POWER SUPPLY CIRCUIT, ELECTRONIC COMPONENT, MOBILE PHONE TERMINAL, AND POWER SUPPLY CONTROL METHOD

(71) Applicant: Huawei Technologies Co., Ltd., Guangdong (CN)

(72) Inventors: Yujian Lin, Shenzhen (CN); Haitao Chen, Shenzhen (CN); Yue Chen, Shenzhen (CN); Zhiqiang Xiang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/750,999

(22) Filed: Jan. 23, 2020

(65) Prior Publication Data

US 2020/0161978 A1 May 21, 2020

Related U.S. Application Data

(63) Continuation of application No. PCT/CN2018/098537, filed on Aug. 3, 2018.

(30) Foreign Application Priority Data

Aug. 4, 2017 (CN) .......................... 201710661456.6

(51) Int. Cl.
*H02M 1/00* (2006.01)
*H02M 3/158* (2006.01)
(Continued)

(52) U.S. Cl.
CPC ............ *H02M 3/1584* (2013.01); *G06F 1/28* (2013.01); *H02M 3/33576* (2013.01);
(Continued)

(58) Field of Classification Search
CPC .......... H02M 3/1584; H02M 3/33576; H02M 2001/0006; H02M 2001/007; H02M 2001/0074; G06F 1/28
See application file for complete search history.

(56) References Cited

U.S. PATENT DOCUMENTS 7,872,886 B2   1/2011  Xu et al.
2002/0056708 A1   5/2002  Moriguchi et al.
(Continued)

FOREIGN PATENT DOCUMENTS

CN   1353027 A   6/2002
CN   1159126 C   7/2004
(Continued)

*Primary Examiner* — Kyle J Moody
*Assistant Examiner* — Jye-June Lee
(74) *Attorney, Agent, or Firm* — Womble Bond Dickinson (US) LLP

(57) ABSTRACT

A power supply circuit is disclosed. The circuit includes n capacitors, m power branches, and a control chip, where the m power branches include at least one first-type power branch and at least one second-type power branch, the first-type power branch includes a pre-boost topology structure and an open-loop topology structure connected in series to the pre-boost topology structure, the pre-boost topology structure is connected to the control chip, the pre-boost topology structure includes a straight-through state and a closed-loop state, and the control chip is configured to control, based on an output voltage of the power source, the pre-boost topology structure to switch between the straight-through state and the closed-loop state, so that the pre-boost topology structure pre-adjusts the output voltage of the power source and outputs a voltage range that meets a requirement of the open-loop topology structure.

10 Claims, 7 Drawing Sheets

(51) Int. Cl.
  *G06F 1/28* (2006.01)
  *H02M 3/335* (2006.01)

(52) U.S. Cl.
  CPC .............. *H02M 2001/0006* (2013.01); *H02M 2001/007* (2013.01); *H02M 2001/0074* (2013.01)

(56) References Cited

U.S. PATENT DOCUMENTS

| | | | |
|---|---|---|---|
| 2005/0185430 A1* | 8/2005 | Vinciarelli | H02M 3/1584 363/65 |
| 2009/0206804 A1 | 8/2009 | Xu et al. | |
| 2012/0033452 A1 | 2/2012 | Torrico-Bascop et al. | |
| 2016/0181865 A1 | 6/2016 | Hu et al. | |
| 2020/0161978 A1 | 5/2020 | Lin et al. | |

FOREIGN PATENT DOCUMENTS

| | | | |
|---|---|---|---|
| CN | 101345490 A | | 1/2009 |
| CN | 101635505 A | | 1/2010 |
| CN | 102405587 A | | 4/2012 |
| CN | 102594170 A | | 7/2012 |
| CN | 103248232 A | * | 8/2013 |
| CN | 104158400 A | | 11/2014 |
| CN | 204733073 U | | 10/2015 |
| CN | 105790586 A | | 7/2016 |
| CN | 105958828 A | | 9/2016 |
| CN | 106160491 A | | 11/2016 |
| CN | 107395014 A | | 11/2017 |
| CN | 107947588 A | * | 4/2018 |
| CN | 108322056 A | * | 7/2018 |

* cited by examiner

POWER SUPPLY CIRCUIT, ELECTRONIC COMPONENT, MOBILE PHONE TERMINAL, AND POWER SUPPLY CONTROL METHOD

CROSS-REFERENCE TO RELATED APPLICATIONS

This application is a continuation of International Application No. PCT/CN2018/098537, filed on Aug. 3, 2018, which claims priority to Chinese Patent Application No. 201710661456.6, filed on Aug. 4, 2017, the disclosures of which are incorporated herein by reference in their entireties.

TECHNICAL FIELD

This application relates to the field of power supply technologies, and in particular, to a power supply circuit, an electronic component, a mobile phone terminal, and a power supply control method.

BACKGROUND

Some components in an electronic device are usually powered by using a power supply circuit. For example, a central processing unit (CPU) or a memory in a mobile phone or a computer is powered by using a power supply circuit. For another example, a CPU in a router is powered by using a power supply circuit. An input terminal of a power supply circuit is connected in parallel to a power source, and an output terminal of the power supply circuit is connected in parallel to an input terminal of a power-consuming device. In addition, the power source may be a power source in an electronic device. For example, when the electronic device is a mobile phone, the power source may be a battery in the mobile phone. Alternatively, the power source may be a power source outside an electronic device. For example, when the electronic device is a router, the power source may be an alternating current power source connected to the router by using a power cable, or may be a transformed alternating current power source.

A power supply circuit in a related technology includes two capacitors configured to connect to a power source in series, and two power branches that are connected in parallel, where each power branch is connected to one capacitor in parallel. Of the two power branches, one power branch includes an open-loop topology structure, and the other power branch includes a closed-loop topology structure. A circuit gain of the open-loop topology structure is a fixed value, and the circuit gain is a ratio of an output voltage to an input voltage. In other words, an input voltage required by the open-loop topology structure is a ratio of a required output voltage to the circuit gain.

When an output voltage of the power source is less than the ratio, a voltage that can be allocated to the open-loop topology structure is certainly less than the ratio, and correspondingly, the output voltage of the open-loop topology structure is less than the required output voltage. Therefore, an output voltage range of the power source that can be applied in the foregoing solution is relatively narrow, and cannot meet application requirements in some scenarios.

SUMMARY

To resolve a problem of a relatively narrow output voltage range of a power source in a related technology, embodiments of this application provide a power supply circuit, an electronic component, a mobile phone terminal, and a power supply control method. An input terminal of the power supply circuit is connected in parallel to a power source, and an output terminal of the power supply circuit is connected in parallel to an input terminal of a power-consuming device. In addition, the power source may be a power source in an electronic device. For example, when the electronic device is a mobile phone, the power source may be a battery in the mobile phone. Alternatively, the power source may be a power source outside an electronic device. For example, when the electronic device is a router, the power source may be an alternating current power source connected to the router by using a power cable, or may be a transformed alternating current power source.

According to a first aspect, a power supply circuit is provided. The power supply circuit includes n capacitors, m power branches, and a control chip, where the n capacitors are connected in series to a power source that supplies power to the power supply circuit, each power branch is connected in parallel to at least one of the n capacitors, the m power branches include at least one first-type power branch and at least one second-type power branch, an output voltage of the m power branches connected in parallel serves as an output voltage of the power supply circuit, and n and m are integers greater than or equal to 2;

a pre-boost topology structure includes a first switching transistor and a second switching transistor, and the pre-boost topology structure includes a straight-through state and a closed-loop state, where the straight-through state is a state in which the first switching transistor is closed and the second switching transistor is open so that an output voltage of the pre-boost topology structure is equal to an input voltage of the pre-boost topology structure, and the closed-loop state is a state in which duty cycles of the first switching transistor and the second switching transistor change with the output voltage of the pre-boost topology structure; and the control chip is connected to the pre-boost topology structure, and is configured to control, based on an output voltage of the power source, the pre-boost topology structure to switch between the straight-through state and the closed-loop state, so that the pre-boost topology structure pre-adjusts the output voltage of the power source and outputs a voltage that falls within a voltage range required by the open-loop topology structure.

At least one first-type power branch and at least one second-type power branch are arranged in the m power branches, and the first-type power branch includes the pre-boost topology structure and the open-loop topology structure connected in series to the pre-boost topology structure. The pre-boost topology structure is connected to the control chip, and the control chip controls, based on the output voltage of the power source, the pre-boost topology structure to switch between the straight-through state and the closed-loop state, so that the pre-boost topology structure pre-adjusts the output voltage of the power source and outputs the voltage range that meets a requirement of the open-loop topology structure. In other words, the first-type power branch can operate regardless of the output voltage of the power source. This resolves a problem of a relatively narrow input voltage range of a power supply circuit in a related technology, and supports a relatively broad input voltage range while ensuring high efficiency.

In one embodiment, the control chip is further configured to control, based on the output voltage of the power source, the pre-boost topology structure to switch between the straight-through state and the open-loop state, where the open-loop state is a state in which the first switching transistor and the second switching transistor operate at a preset duty cycle.

In another embodiment, the control chip is further configured to: when the output voltage of the power source is higher than a preset voltage, control the pre-boost topology structure to be in the straight-through state; and when the output voltage of the power source is lower than the preset voltage, control the pre-boost topology structure to be in the closed-loop state.

In one embodiment, when the closed-loop topology structure is a topology structure that switches between an open-loop state and a closed-loop state, the control chip is further configured to: when the output voltage of the power source is higher than the preset voltage, control the topology structure that switches between the open-loop state and the closed-loop state to be in the closed-loop state; and when the output voltage of the power source is lower than the preset voltage, control the topology structure that switches between the open-loop state and the closed-loop state to be in the open-loop state.

In one embodiment, the control chip is further configured to: when the output voltage of the power source is higher than a preset voltage, control the pre-boost topology structure to be in the straight-through state; and when the output voltage of the power source is lower than the preset voltage, control the pre-boost topology structure to be in the open-loop state.

In one embodiment, when the pre-boost topology structure is in the open-loop state, the input voltage of the pre-boost topology structure is a preset value, where the preset value is greater than a first threshold and less than a second threshold, the first threshold is less than the second threshold, the first threshold is greater than or equal to ½ of a maximum output voltage of the power source, the second threshold is less than or equal to a minimum output voltage of the power source, and the minimum output voltage is less than ½ of the maximum output voltage.

In one embodiment, the closed-loop topology structure is a buck topology structure.

According to a second aspect, an electronic component is provided. The electronic component includes the power supply circuit according to any one of the first aspect or the possible implementations of the first aspect and a power-consuming device, an input terminal of the power supply circuit is connected in parallel to a power source, and an output terminal of the power supply circuit is connected in parallel to an input terminal of the power-consuming device.

According to a third aspect, a mobile phone terminal is provided. The mobile phone terminal includes the electronic component according to the second aspect.

According to a fourth aspect, a mobile phone terminal is provided. The mobile phone terminal includes the power supply circuit according to any one of the first aspect or the possible implementations of the first aspect and a power-consuming device, an input terminal of the power supply circuit is connected to the power source, and an output terminal of the power supply circuit is connected in parallel to an input terminal of the power-consuming device, where the power source is a battery of the mobile phone terminal.

According to a fifth aspect, a power supply control method is provided. The method is applied to the power supply circuit according to the first aspect, and the method includes:

obtaining an output voltage of the power source; and controlling, based on the output voltage of the power source, the pre-boost topology structure to switch between the straight-through state and the closed-loop state.

At least one first-type power branch and at least one second-type power branch are arranged in the m power branches, and the first-type power branch includes the pre-boost topology structure and the open-loop topology structure connected in series to the pre-boost topology structure. The pre-boost topology structure is connected to the control chip, and the control chip controls, based on the output voltage of the power source, the pre-boost topology structure to switch between the straight-through state and the closed-loop state. In other words, the first-type power branch can operate regardless of the output voltage of the power source. This resolves a problem of a relatively narrow input voltage range of a power supply circuit in a related technology, and supports a relatively broad input voltage range while ensuring high efficiency.

In one embodiment, the controlling, based on the output voltage of the power source, the pre-boost topology structure to switch between the straight-through state and the closed-loop state includes:

when the output voltage of the power source is higher than a preset voltage, controlling the pre-boost topology structure to be in the straight-through state; and when the output voltage of the power source is lower than the preset voltage, controlling the pre-boost topology structure to be in the closed-loop state.

In one embodiment, when the closed-loop topology structure is a topology structure that switches between an open-loop state and a closed-loop state, the method further includes:

when the output voltage of the power source is higher than the preset voltage, controlling the topology structure that switches between the open-loop state and the closed-loop state to be in the closed-loop state; and when the output voltage of the power source is lower than the preset voltage, controlling the topology structure that switches between the open-loop state and the closed-loop state to be in the open-loop state.

In one embodiment, the pre-boost topology structure includes a straight-through state and an open-loop state, and the method further includes:

controlling, based on the output voltage of the power source, the pre-boost topology structure to switch between the straight-through state and the open-loop state, where the open-loop state is a state in which the first switching transistor and the second switching transistor operate at a preset duty cycle.

In one embodiment, the controlling, based on the output voltage of the power source, the pre-boost topology structure to switch between the straight-through state and the open-loop state includes:

when the output voltage of the power source is higher than a preset voltage, controlling the pre-boost topology structure to be in the straight-through state; and when the output voltage of the power source is lower than the preset voltage, controlling the pre-boost topology structure to be in the open-loop state.

DESCRIPTION OF EMBODIMENTS

Figure 1:
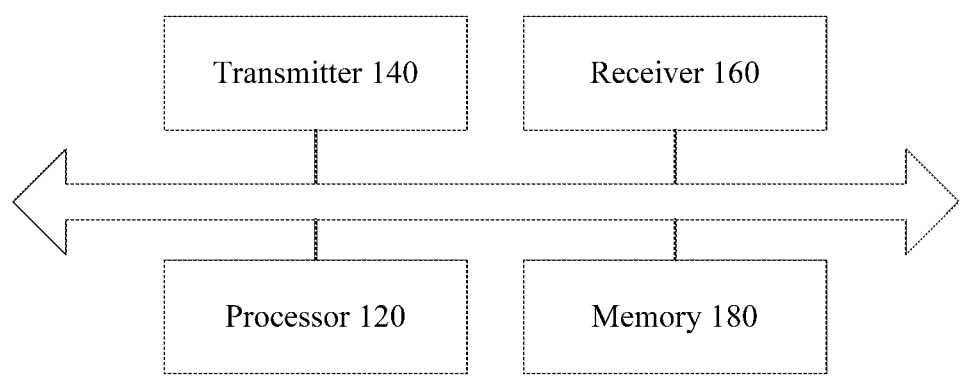
FIG. 1 is a schematic structural diagram of an electronic device according to an embodiment.

To make the objectives, technical solutions, and advantages of this application clearer, the following further describes the implementations of this application in detail with reference to the accompanying drawings.

"First", "second", or the like mentioned in this specification is not intended to indicate any order, quantity, or importance, but is intended to distinguish different constituent parts. Likewise, "a/an", "one", or the like is not intended to indicate a quantity limitation either, but is intended to indicate existing at least one. "Connection", "link", or the like is not limited to a physical or mechanical connection, but may include an electrical connection, whether direct or indirect.

A "module" mentioned in this specification usually refers to a program or an instruction that is stored in a memory and can implement some functions. A "unit" mentioned in this specification usually refers to a functional structure divided according to logic. The "unit" may be implemented by only hardware, or implemented by a combination of software and hardware.

In this specification, "a plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Several terms in this specification are described first.

1. Circuit gain: a ratio of an output voltage to an input voltage.

2. Open-loop topology structure: a circuit in which a switching transistor operates under a fixed frequency and a fixed duty cycle. A circuit gain of the circuit is a fixed value.

In one embodiment, depending on different states of the switching transistor in the open-loop topology structure, the open-loop topology structure may be in a straight-through state or an open-loop state. The straight-through state is a state in which a first switching transistor in the topology structure is closed and a second switching transistor is open so that an output voltage of the topology structure is equal to an input voltage of the topology structure, and the open-loop state is a state in which the first switching transistor and the second switching transistor operate at a preset duty cycle. In one embodiment, depending on different circuit structures, the first switching transistor may include at least one switching transistor, and likewise, the second switching transistor may include at least one switching transistor. Terms "first" and "second" mentioned in the embodiments are merely intended to indicate function division, and do not limit an actual quantity.

3. Closed-loop topology structure: a circuit in which an output voltage is used as a feedback signal to control a duty cycle of a switching transistor, so as to stabilize the output voltage. Similar to the open-loop topology structure, the closed-loop topology structure may also be in a straight-through state or a closed-loop state depending on a closed or open state of the switching transistor. Details are not described herein again. The closed-loop state is a state in which duty cycles of a first switching transistor and a second switching transistor change with an output voltage of the topology structure.

4. Topology structure that switches between an open-loop state and a closed-loop state: a topology structure that is controlled to be in the open-loop state or the closed-loop state by a control chip.

Referring to FIG. 1, FIG. 1 is a structural diagram of an electronic device according to an embodiment. As shown in FIG. 1, the electronic device may include a processor 120, a transmitter 140 connected to the processor 120, and a receiver 160 connected to the processor 120. A person skilled in the art may understand that the structure of the electronic device shown in FIG. 1 does not constitute any limitation on the electronic device, and the electronic device may include parts more or fewer than those shown in the figure, or a combination of some parts, or parts disposed differently. For example, the electronic device further includes a memory 180, a power source, and the like.

The processor 120 is a control center of the electronic device. The processor 120 uses various interfaces and lines to connect all parts of the entire electronic device, and executes various functions of the electronic device and processes data by running or executing a software program and/or a module stored in a memory 180 and by invoking data stored in the memory 180, so as to perform overall control over the electronic device. In one embodiment, the processor 120 may include one or more processing cores. In one embodiment, an application processor and a modem processor may be integrated into the processor 120. The application processor mainly processes an operating system, a user interface, an application program, and the like, and the modem processor mainly processes wireless communication. It can be understood that the modem processor may be not integrated into the processor 120, and the modem processor may be separately implemented as a chip.

The memory 180 may be configured to store a software program and a module. The processor 120 runs the software program and the module that are stored in the memory 180, so as to execute various functions and applications and process data. The memory 180 may mainly include a program storage area and a data storage area. The data storage area may store data (such as audio data and a phone book) and the like that are created according to usage of the electronic device. In addition, the memory 180 may be implemented by any type of volatile or non-volatile storage device or a combination thereof.

The transmitter 140 may include a radio frequency transmit component, such as an antenna. The transmitter 140 is configured to carry data or information in a radio signal and transmit the radio signal, where the radio signal may be a time-frequency resource in a mobile communications system.

The receiver 160 may include a radio frequency receive component, such as an antenna. The receiver 160 is configured to receive data or information carried in a radio signal, where the radio signal may be a time-frequency resource in the mobile communications system.

In one embodiment, the processor 120, the transmitter 140, the receiver 160, and the memory 180 may all be powered by using a power supply circuit provided in the following embodiments. In addition, in this case, an input terminal of the power supply circuit is connected in parallel to a power source, and an output terminal of the power supply circuit is connected in parallel to an input terminal of a component that needs to be powered (such as the above-mentioned processor, transmitter, receiver, or memory). In one embodiment, the power source may be a power source in an electronic device. For example, when the electronic device is a mobile phone, the power source is a battery in the mobile phone. In one embodiment, the power source may be a power source outside an electronic device. For example, when the electronic device is a desktop computer, the power source is an alternating current power source connected to the desktop computer by using a power cable. In addition, a hardware structure corresponding to the electronic device when the electronic device is a device such as a mobile phone, a tablet computer, or an electronic reader is used only as an example in the figure. In one embodiment, the electronic device may alternatively be a device such as a desktop computer or an industrial powered device. In this case, a structure of the electronic device may be different correspondingly. This is not limited in this embodiment.

Figure 2A:
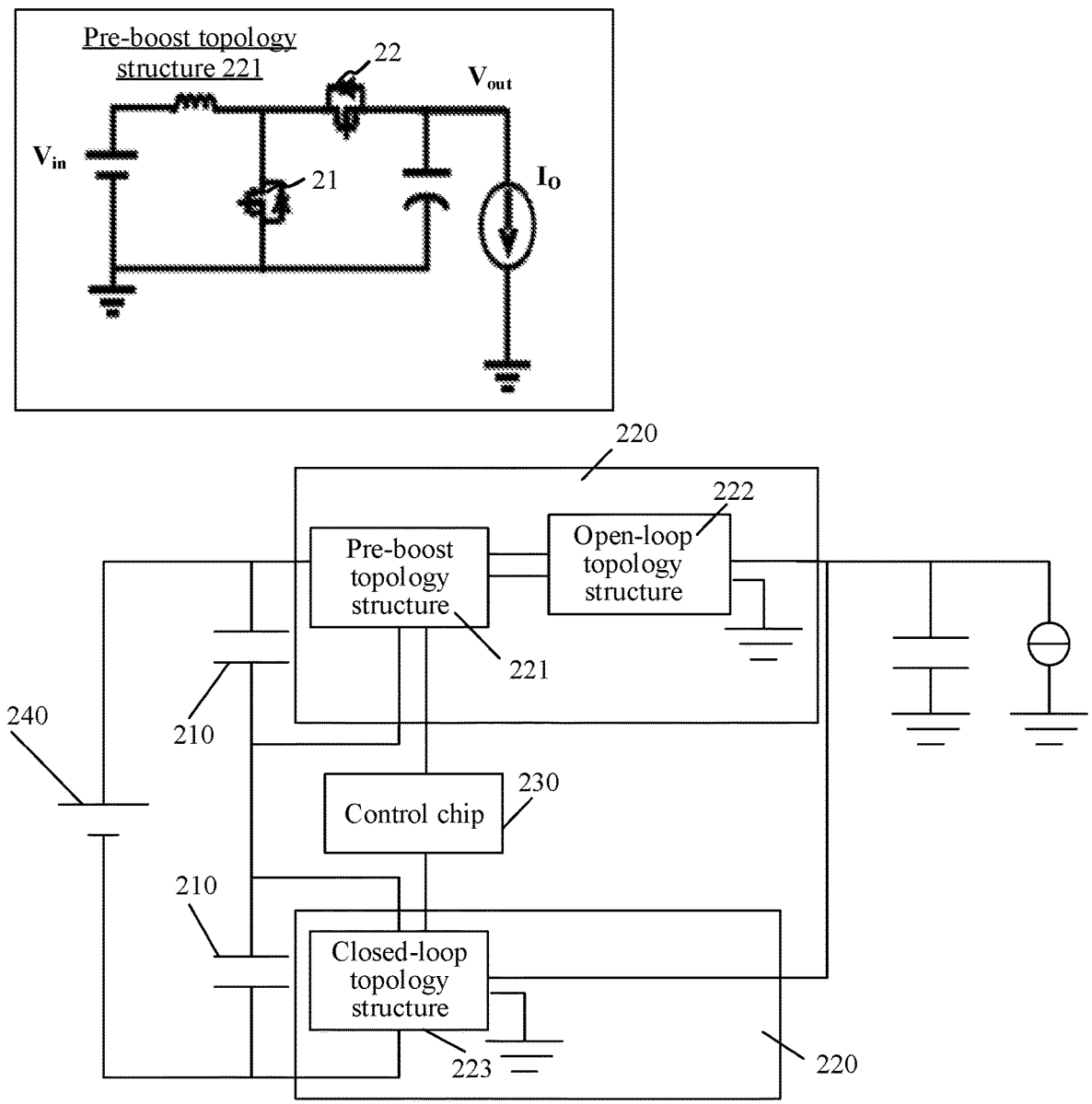
FIG. 2A is a schematic diagram of a power supply circuit according to an embodiment.

Referring to FIG. 2A, FIG. 2A is a schematic structural diagram of a power supply circuit according to an embodiment. As shown in FIG. 2A, the power supply circuit includes n capacitors 210, m power branches 220, and a control chip 230. The n capacitors 210 are connected in series to a power source 240 that supplies power to the power supply circuit, each power branch 220 is connected in parallel to at least one capacitor 210, the m power branches 220 include at least one first-type power branch and at least one second-type power branch, and n and m are integers greater than or equal to 2.

The first-type power branch includes a pre-boost topology structure 221 and an open-loop topology structure 222 connected in series to the pre-boost topology structure 221, and the second-type power branch includes a closed-loop topology structure 223.

In one embodiment, as shown in FIG. 2A, two input terminals of the pre-boost topology structure 221 are connected to two terminals of the capacitor 210 that is connected in parallel to the pre-boost topology structure 221, and two output terminals of the pre-boost topology structure 221 are connected to an input terminal of the open-loop topology structure 222.

The pre-boost topology structure 221 includes a first switching transistor and a second switching transistor. A straight-through state is a state in which the first switching transistor is closed and the second switching transistor is open so that an output voltage of the topology structure is equal to an input voltage of the topology structure, and a closed-loop state is a state in which duty cycles of the first switching transistor and the second switching transistor change with the output voltage of the topology structure. With reference to FIG. 2A, when a switching transistor 21 is in a closed state while a switching transistor 22 is in an open state, a boost open-loop topology structure shown in the figure is in the straight-through state. In this case, an output voltage Vout of the topology structure is equal to Vin. When the switching transistor 21 and the switching transistor 22 are alternately in the open or closed state, the boost open-loop topology structure shown in the figure is in an open-loop state. The boost open-loop topology structure shown in the figure is used only as an example for description. In one embodiment, the boost open-loop topology structure may be another structure, and details are not described herein. In addition, the pre-boost topology structure 231 may alternatively be a boost closed-loop topology structure. The boost closed-loop topology structure differs from the boost open-loop topology structure in that a feedback circuit is disposed for feeding back the output voltage to input. Details are not described herein in this embodiment.

The pre-boost topology structure 231 is connected to the control chip 230.

The pre-boost topology structure 231 includes the straight-through state and the closed-loop state. The control chip 230 is configured to control, based on an output voltage of the power source 240, the boost closed-loop topology structure to switch between the straight-through state and the closed-loop state, so that the pre-boost topology structure pre-adjusts the output voltage of the power source and outputs a voltage range that meets a requirement of the open-loop topology structure.

In this embodiment, the control chip 230 is configured to control a state of the pre-boost topology structure 221. Because whether the pre-boost topology structure 221 is in the straight-through state or the closed-loop state is determined by a switching transistor in the pre-boost topology structure 221, in one embodiment, the control chip 230 is connected to the switching transistor in the pre-boost topology structure 221.

Figure 2B:
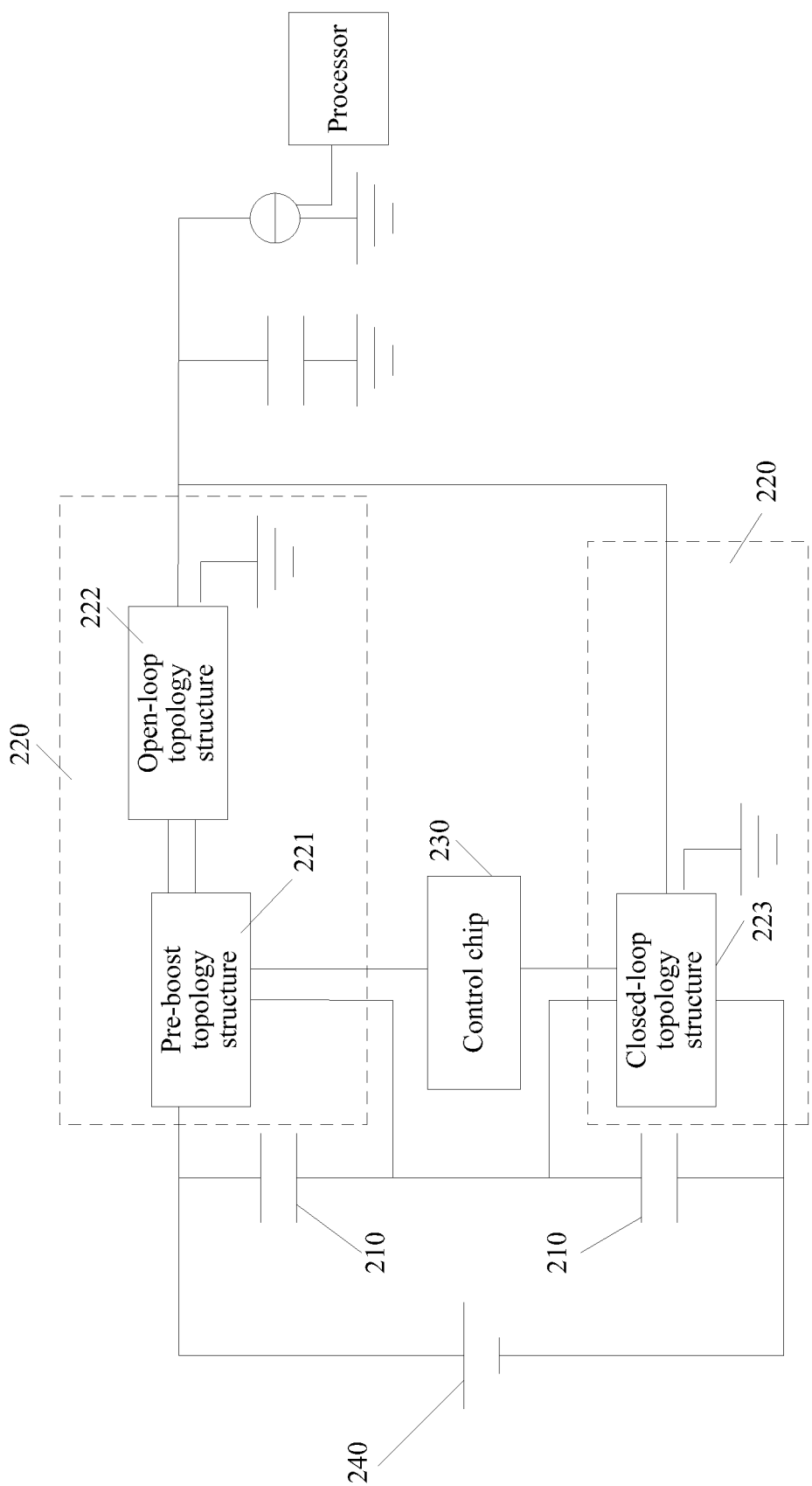
FIG. 2B is a schematic diagram of connection between a power supply circuit according to an embodiment and another component when the power supply circuit supplies power to the other component.

In addition, when the power supply circuit supplies power to a component, an output terminal of the power supply circuit may be connected to an input terminal of the component that needs to be powered. For example, assuming that the power supply circuit supplies power to a processor, FIG. 2B is a schematic diagram of connection between the power supply circuit and the processor. An input terminal of the power supply circuit is connected in parallel to the power source, and the output terminal of the power supply circuit is connected in parallel to an input terminal of a power-consuming device. In addition, the power source may be a power source in an electronic device. For example, when the electronic device is a mobile phone, the power source may be a battery in the mobile phone. Alternatively, the power source may be a power source outside an electronic device. For example, when the electronic device is a router, the power source may be an alternating current power source connected to the router by using a power cable, or may be a transformed alternating current power source.

To sum up, in the power supply circuit provided in this embodiment, at least one first-type power branch and at least one second-type power branch are arranged in the m power branches, and the first-type power branch includes the pre-boost topology structure and the open-loop topology structure connected in series to the pre-boost topology structure. The pre-boost topology structure is connected to the control chip, and the control chip controls, based on the output voltage of the power source, the pre-boost topology structure to switch between the straight-through state and the closed-loop state, so that the pre-boost topology structure pre-adjusts the output voltage of the power source and outputs the voltage range that meets a requirement of the open-loop topology structure. In other words, the first-type power branch can operate regardless of the output voltage of the power source. This resolves a problem of a relatively narrow input voltage range of a power supply circuit in a related technology, and supports a relatively broad input voltage range while ensuring high efficiency.

In the foregoing embodiments, the pre-boost topology structure may be a boost closed-loop topology structure including the straight-through state and the closed-loop state, or may be a boost open-loop topology structure including the straight-through state and the open-loop state. Depending on different structures of the pre-boost topology structure, a working principle of the power supply circuit differs. Therefore, the following describes the foregoing two cases separately in detail in two different embodiments.

Figure 3A:
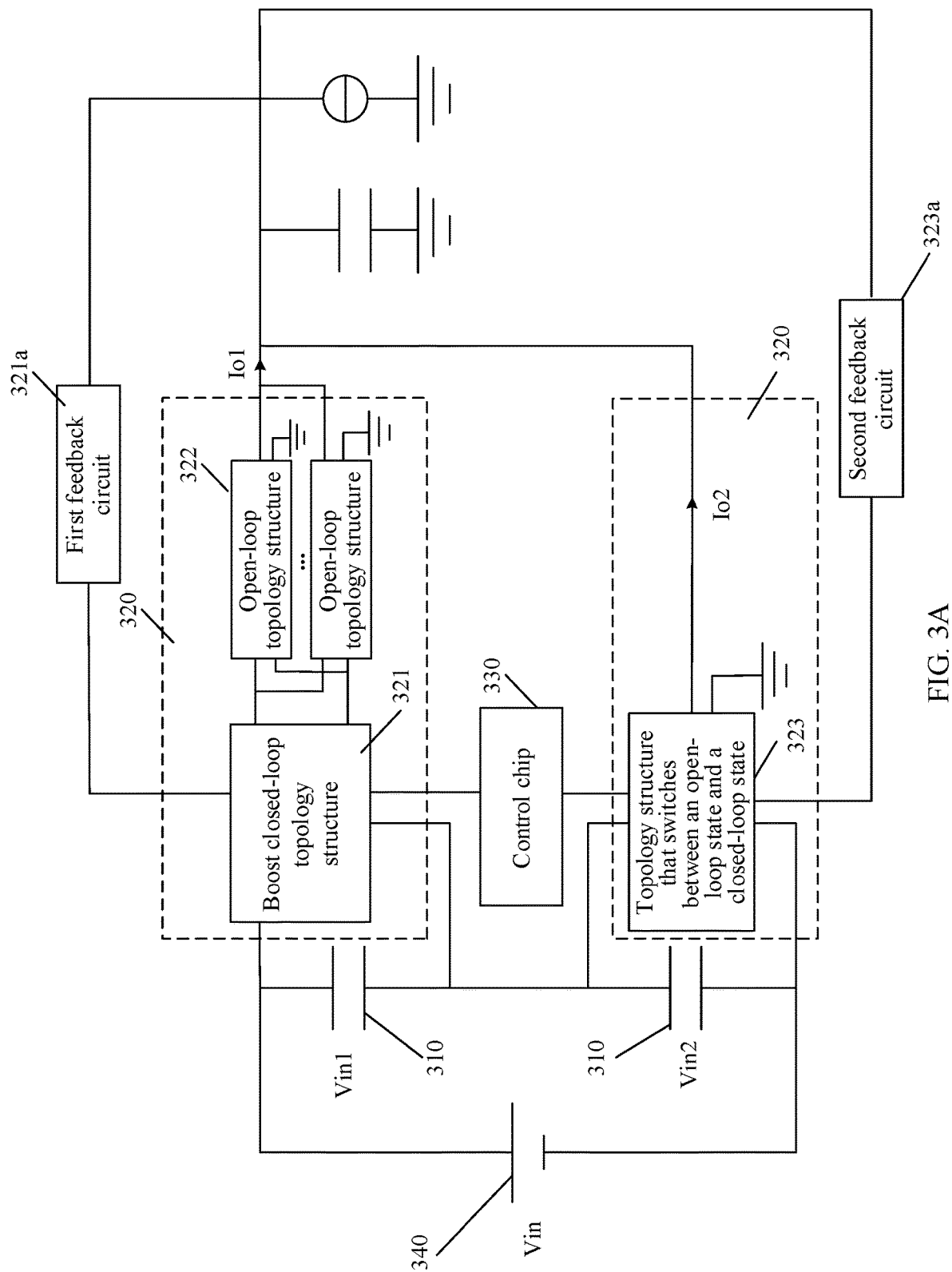
FIG. 3A is a schematic diagram of a power supply circuit according to an embodiment.

Referring to FIG. 3A, FIG. 3A is a schematic structural diagram of a power supply circuit according to an embodiment. This embodiment provides description by using an example in which a pre-boost topology structure is a boost closed-loop topology structure including a straight-through state and a closed-loop state. As shown in FIG. 3A, the power supply circuit includes n capacitors 310, m power branches 320, and a control chip 330. The n capacitors 310 are connected in series to a power source 340 that supplies power to the power supply circuit, each power branch 330 is connected in parallel to at least one capacitor 320, the m power branches 320 include at least one first-type power branch and at least one second-type power branch, and n and m are integers greater than or equal to 2. FIG. 3A uses only n=2 as an example for description.

Because the n capacitors 310 are connected in series to the power source 340, the n capacitors 310 divide an output voltage of the power source 340. For example, n=2. With reference to FIG. 3A, two capacitors divide the output voltage of the power source 340 (labelled as Vin) into two input voltages Vin1 and Vin2, where Vin1 serves as an input voltage of a first-type power branch connected in parallel to a capacitor 1, Vin2 serves as an input voltage of a second-type power branch connected in parallel to a capacitor 2, and Vin1+Vin2=Vin. After the power supply circuit is powered, initial values of Vin1 and Vin2 depend on capacities of the two capacitors. In addition, assuming that an output current of the first-type power branch is Io1, an output current of the second-type power branch is Io2, and efficiency of each power branch is 100%, for the first-type power branch, Vin1*Iin1=Vout1*Io1, and for the second-type power branch, Vin2*Iin2=Vout2*Io2. In addition, currents of the two capacitors connected in series are the same, that is, Iin1=Iin2. In addition, the two power branches are connected in parallel, that is, Vout1=Vout2. Therefore, it can be learned through mathematical calculation that Io1/Io2=Vin1/Vin2.

The first-type power branch includes a boost closed-loop topology structure 321 that switches between a straight-through state and a closed-loop state, and an open-loop topology structure 322 connected in series to the boost closed-loop topology structure 321.

Figure 3B:
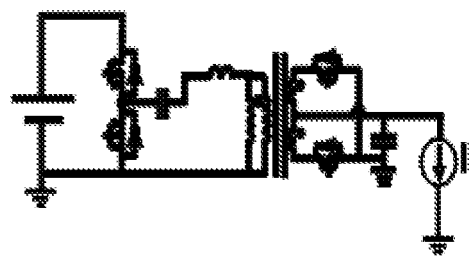
FIG. 3B is a possible schematic diagram of an open-loop topology structure according to an embodiment.

The boost closed-loop topology structure 321 may be a boost chopper circuit topology structure having a straight-through state, a boost single-bridge topology structure having a straight-through state, or a boost dual-bridge topology structure having a straight-through state. This is not limited in this embodiment. In one embodiment, the boost closed-loop topology structure 321 may be selected based on an actual application requirement. However, a principle to be followed during the selection is that the boost closed-loop topology structure can operate in the straight-through state and possesses a boost function. An actual implementation form of the boost closed-loop topology structure is not limited. In addition, the open-loop topology structure 322 may be an LLC topology structure, a structure shown in FIG. 3B, or a topology structure of another type. A circuit gain of the open-loop topology structure 322 is a preset value, for example, 1:44. In one embodiment, there may be one or more open-loop topology structures 322. For example, if a current that can be shared by each open-loop topology structure 322 is 10 A, and an output current that needs to be implemented by the first-type power branch is Io1=100 A, the open-loop topology structure 322 may include 10 open-loop topology structures 322 connected in series to the boost closed-loop topology structure 321 having the straight-through state, and the 10 open-loop topology structures 322 are connected in parallel to each other.

The boost closed-loop topology structure 321 is connected to the control chip 330. The control chip 330 may obtain an output voltage of the power source 340, and controls an operating status of the boost closed-loop topology structure 321 based on the obtained output voltage. The control chip 330 controls the operating status of the boost closed-loop topology structure 321 in the following control manner.

When the output voltage is higher than a preset voltage, the control chip 330 controls the boost closed-loop topology structure 321 to be in the straight-through state. Correspondingly, the boost closed-loop topology structure 321 is in the straight-through state under the control of the control chip 330. When the output voltage is lower than the preset voltage, the control chip 330 controls the boost closed-loop topology structure 321 to be in the closed-loop state. Correspondingly, the boost closed-loop topology structure 321 is in the closed-loop state under the control of the control chip 330.

The preset voltage is a voltage preset by a designer in the power supply circuit. For example, the preset voltage is 44 V, 50 V, or 52 V.

For example, the preset voltage is 44 V. When the output voltage of the power source 340 is 48 V, because 48 V is greater than 44 V, the control chip 330 controls the boost closed-loop topology structure 321 to be in the straight-through state. When the output voltage of the power source 340 is 35 V, because 35 V is less than 44 V, the control chip 330 controls the boost closed-loop topology structure 321 to be in the closed-loop state.

Because the boost closed-loop topology structure 321 is in the closed-loop state when the output voltage of the power source 340 is less than the preset voltage, the boost closed-loop topology structure 321 further includes a first feedback circuit 321a that is configured to feed back an output voltage of the power supply circuit to the boost closed-loop topology structure 321, so as to ensure normal operation of the boost closed-loop topology structure 321 in the closed-loop state. The first feedback circuit 321a feeds back an actual output voltage of the power supply circuit to an input terminal of the boost closed-loop topology structure 321, so that when the actual output voltage is different from a preset required output voltage, the boost closed-loop topology structure 321 in the closed-loop state may continuously adjust a duty cycle of a switching transistor of the boost closed-loop topology structure 321, so as to make the actual output voltage of the power supply circuit equal to the preset required output voltage. After the duty cycle of the switching transistor is adjusted, impedance of the boost closed-loop topology structure 321 also changes. Therefore, a divided voltage of the capacitor 1 corresponding to the boost closed-loop topology structure 321 also changes. For example, the preset required output voltage is 1 V. When the actual output voltage fed back by the first feedback circuit 321a is 1.5 V, the boost closed-loop topology structure 321 may decrease the duty cycle. After the duty cycle is decreased, the divided voltage of the capacitor 1 decreases, and correspondingly, a divided voltage of the capacitor 2 increases. On the contrary, when the actual output voltage fed back by the first feedback circuit 321a is 0.8 V, the boost closed-loop topology structure 321 may increase the duty cycle. After the duty cycle is increased, the divided voltage of the capacitor 1 increases, and correspondingly, the divided voltage of the capacitor 2 decreases.

Figure 3C:
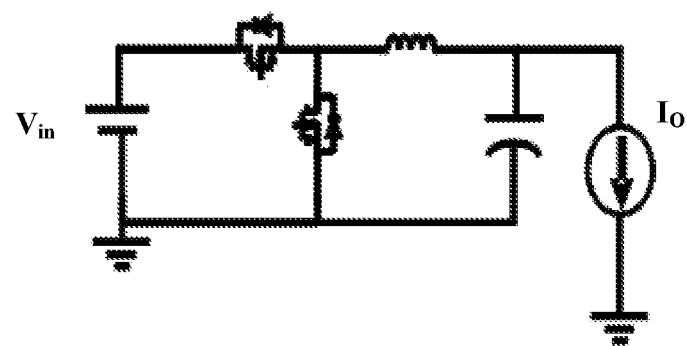
FIG. 3C is a possible schematic diagram of a closed-loop topology structure according to an embodiment.

The second-type power branch includes a closed-loop topology structure 323, and the closed-loop topology structure 323 may include a second feedback circuit 323a that is configured to feed back the output voltage of the power supply circuit to the closed-loop topology structure 323. Similar to the first feedback circuit 321a, the second feedback circuit 323a is disposed so that the closed-loop topology structure 323 can continuously adjust an input voltage, or a duty cycle of a switching transistor of the closed-loop topology structure 323, or both the input voltage and the duty cycle based on the fed-back output voltage, to output a stable voltage with a specified voltage value. Referring to FIG. 3C, FIG. 3C is a possible schematic diagram of the closed-loop topology structure 323 according to this embodiment.

In one embodiment, the closed-loop topology structure 323 may be a topology structure that switches between an open-loop state and a closed-loop state. The open-loop state means that a feedback circuit in the structure is open, whereas the closed-loop state means that the feedback circuit in the structure is closed. In this case, to determine an operating status of the topology structure that switches between the open-loop state and the closed-loop state, the topology structure that switches between the open-loop state and the closed-loop state may further be connected to the control chip 330, and the control chip 330 controls, in the following control manner, the operating status of the topology structure that switches between the open-loop state and the closed-loop state:

when the output voltage of the power source 340 is higher than the preset voltage, controlling the topology structure that switches between the open-loop state and the closed-loop state to be in the closed-loop state; and when the output voltage of the power source 340 is lower than the preset voltage, controlling the topology structure that switches between the open-loop state and the closed-loop state to be in the open-loop state.

When the topology structure that switches between the open-loop state and the closed-loop state is in the open-loop state, a circuit gain of the topology structure is a preset value, for example, 1:2. In some embodiments, the circuit gain may alternatively be another value.

It should be supplementary noted that when the power supply circuit is used in a scenario with small voltage output, the closed-loop topology structure 323 may be a buck topology structure, for example, a buck conversion circuit. However, when the power supply circuit is used in a scenario with large voltage output, the closed-loop topology structure 323 may be a boost topology structure, so that the power source 340 can still meet an application requirement in the case of small voltage output.

In an example, the circuit gain of the open-loop topology structure 322 is 1:44, required output voltage of the power supply circuit is 1 V, and a required output current of the power supply circuit is 100 A. If the output voltage of the power source 340 is 48 V and greater than the preset voltage, the boost closed-loop topology structure 321 is currently in the straight-through state, and the topology structure that switches between the open-loop state and the closed-loop state is in the closed-loop state. When in the closed-loop state, the topology structure that switches between the open-loop state and the closed-loop state continuously adjusts the duty cycle of the switching transistor of the topology structure based on the output voltage fed back by the second feedback circuit 323a, so that both a voltage value of output voltage of the first-type power branch and a voltage value of output voltage of the second-type power branch are 1 V. Apparently, when the output voltage of the first-type power branch is 1 V, the divided voltage of the capacitor 1 is 44 V, and the divided voltage of the capacitor 2 is 48 V−44 V=4 V. In this case, a current of 91.6 A in the power supply circuit is processed by the first-type power branch, and a current of 8.4 A in the power supply circuit is processed by the second-type power branch. Because the first-type power branch is open-loop, efficiency of the power supply circuit is relatively high. However, when the output voltage of the power source 340 is 35 V and less than the preset voltage, the boost closed-loop topology structure 321 is currently in the closed-loop state, and the topology structure that switches between the open-loop state and the closed-loop state is in the open-loop state. In this case, the boost closed-loop topology structure 321 continuously adjusts the duty cycle of the boost closed-loop topology structure 321 based on the output voltage fed back by the first feedback circuit 321a, so that both the voltage value of the output voltage of the first-type power branch and the voltage value of the output voltage of the second-type power branch are 1 V. Apparently, when the circuit gain of the topology structure in the open-loop state is 1:2, the divided voltage of the capacitor 2 is 2 V, and the divided voltage of the capacitor 1 is correspondingly 33 V (35 V−2 V). In this case, a current of 94.3 A in the power supply circuit is processed by the first-type power branch, and a current of 5.7 A in the power supply circuit is processed by the second-type power branch. Because the first-type power branch is open-loop, efficiency of the power supply circuit is relatively high. It can be learned from the example that the power supply circuit can operate with relatively high efficiency no matter whether the output voltage of the power source 340 is greater than the preset voltage or less than the preset voltage. Therefore, the power supply circuit in this embodiment can be applied to an application scenario requiring a broad input voltage range and high efficiency.

To sum up, in the power supply circuit provided in this embodiment, at least one first-type power branch and at least one second-type power branch are arranged in the m power branches, and the first-type power branch includes the pre-boost topology structure and the open-loop topology structure connected in series to the pre-boost topology structure. The pre-boost topology structure is connected to the control chip, and the control chip controls, based on the output voltage of the power source, the boost closed-loop topology structure to switch between the straight-through state and the closed-loop state. In other words, the first-type power branch can operate regardless of the output voltage of the power source. This resolves a problem of a relatively narrow input voltage range of a power supply circuit in a related technology, and supports a relatively broad input voltage range while ensuring high efficiency.

Figure 4:
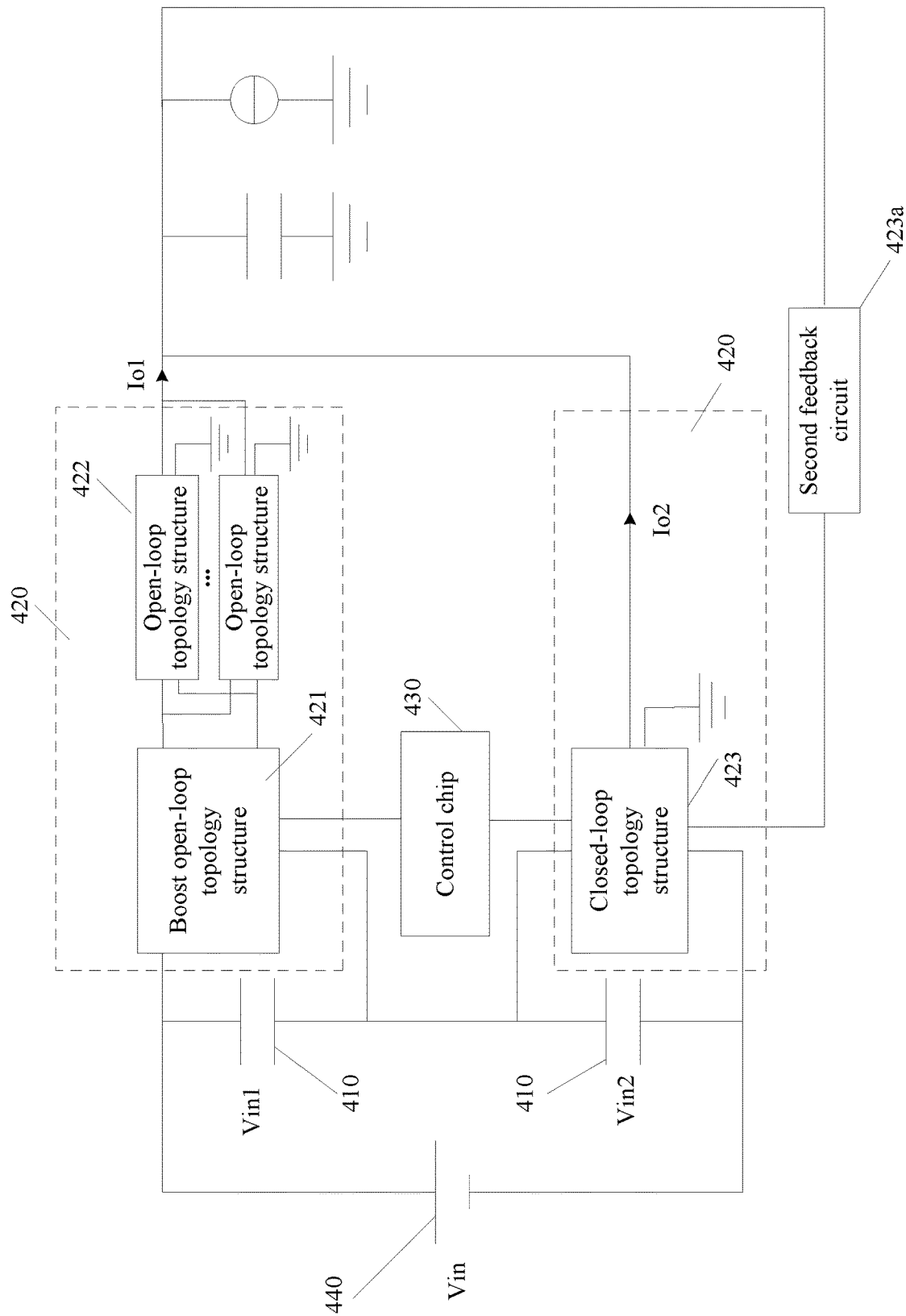
FIG. 4 is a schematic diagram of a power supply circuit according to an embodiment.

Referring to FIG. 4, FIG. 4 is a schematic structural diagram of a power supply circuit according to another embodiment. This embodiment provides description by using an example in which a pre-boost topology structure is a boost open-loop topology structure including a straight-through state and an open-loop state. As shown in FIG. 4, the power supply circuit may include n capacitors 410, m power branches 420, and a control chip 430. The n capacitors 410 are connected in series to a power source 440 that supplies power to the power supply circuit, each power branch 430 is connected in parallel to at least one capacitor 420, the m power branches 420 include at least one first-type power branch and at least one second-type power branch, and n and m are integers greater than or equal to 2. FIG. 4 uses only n=2 as an example for description.

Because the n capacitors 410 are connected in series to the power source 440, the n capacitors 410 divide an output voltage of the power source 440. For example, n=2. With reference to FIG. 4, two capacitors 410 divide the output voltage Vin of the power source 440 into two input voltages Vin1 and Vin2, where Vin1 serves as an input voltage of a first-type power branch connected in parallel to a capacitor 4101, and Vin2 serves as an input voltage of a second-type power branch connected in parallel to a capacitor 4102. Assuming that a current of the first-type power branch is Io1, and a current of the second-type power branch is Io2, it can be learned through mathematical calculation that Io1/Io2=Vin1/Vin2.

The first-type power branch includes a boost open-loop topology structure 421 that switches between a straight-through state and an open-loop state, and an open-loop topology structure 422 connected in series to the boost open-loop topology structure 421. This is similar to the implementation in the foregoing embodiment. A difference is that the boost closed-loop topology structure is used in the foregoing embodiment, whereas the boost open-loop topology structure is used in this embodiment. Details are not described herein again.

In one embodiment, the boost open-loop topology structure 421 is connected to the control chip 430. The control chip 430 may obtain an output voltage of the power source 440, and control an operating status of the boost open-loop topology structure 421 based on the obtained input voltage. The control chip 430 controls the operating status of the boost open-loop topology structure 421 in the following control manner:

when the input voltage is higher than a preset voltage, controlling the boost open-loop topology structure 421 to be in the straight-through state; and when the input voltage is lower than the preset voltage, controlling the boost open-loop topology structure 421 to be in the open-loop state.

Similar to the foregoing embodiment, the preset voltage may be a voltage preset by a designer in the power supply circuit. In addition, in this embodiment, when the boost open-loop topology structure 421 is in the open-loop state, an input voltage of the boost open-loop topology structure 421 is a preset value, where the preset value is greater than a first threshold and less than a second threshold, the first threshold is less than the second threshold, the first threshold is greater than or equal to ½ of a maximum output voltage of the power source, and the second threshold is less than or equal to a minimum output voltage of the power source. In this embodiment, the minimum output voltage of the power source is greater than ½ of the maximum output voltage. In other words, in this embodiment, when the open-loop topology structure having the straight-through state is in the open-loop state, regardless of the output voltage of the power source 440, the input voltage of the open-loop topology structure having the straight-through state is fixedly set to the preset value by using software.

This preset value is a value preset by a designer in the power supply circuit. In one embodiment, to ensure that a majority of the output voltage of the power source 440 can be processed by the first-type power branch (open-loop) with relatively high efficiency, the first threshold is usually a value greater than or equal to ½ of the maximum output voltage value of the power source 440. For example, if a possible maximum output voltage of the power source 440 is 50 V, the first threshold may be 30 V, 28 V, or the like. To ensure that the second-type power branch can still operate normally when the power source 440 outputs the minimum output voltage, the preset value is usually less than the minimum output voltage of the power source 440. For example, if a possible minimum output voltage of the power source 440 is 35 V, the preset value is a value less than 35 V, such as 32 V, 30 V, or the like.

For example, when a preset threshold is 25 V and the preset voltage is 44 V, the preset value may be 30 V. In this case, when the open-loop topology structure having the straight-through state is in the open-loop state, the input voltage of the open-loop topology structure having the straight-through state is fixedly 30 V regardless of the output voltage of the power source 440.

The second-type power branch includes a closed-loop topology structure 423, and the closed-loop topology structure 423 may include a second feedback circuit 423a that is configured to feed back the output voltage of the power supply circuit to the closed-loop topology structure 423. An input voltage of the closed-loop topology structure 423 is obtained by subtracting the output voltage of the boost open-loop topology structure 421 from the input voltage of the power source 440. The second feedback circuit 423a is arranged so that the closed-loop topology structure 423 can output a stable output voltage with a specified value.

Similar to the foregoing embodiment, when the power supply circuit is used in a scenario with small voltage output, the closed-loop topology structure 423 may be a buck topology structure, for example, a buck conversion circuit. However, when the power supply circuit is used in a scenario with large voltage output, the closed-loop topology structure may be a boost topology structure, so that the power source 440 can still meet an application requirement in the case of small voltage output.

In an example, a circuit gain of the open-loop topology structure is 1:44, a required output voltage of the power supply circuit is 1 V, and a required output current of the power supply circuit is 100 A. If the output voltage of the power source 440 is 50 V and greater than the preset voltage, the boost open-loop topology structure 421 is in the straight-through state, and the closed-loop topology structure 423 adjusts a duty cycle of the closed-loop topology structure 423 based on the output voltage fed back by the second feedback circuit 423a, so that when both output voltage of the first-type power branch and output voltage of the second-type power branch are 1 V, the input voltage of the boost open-loop topology structure 421 is 44 V, and the input voltage of the closed-loop topology structure 423 is correspondingly 6 V. It can be learned from the foregoing content that a majority of the output voltage of the power source 440 is processed by the first-type power branch with high efficiency. Therefore, overall efficiency of the power supply circuit is relatively high. However, when the output voltage of the power source 440 is 35 V and less than the preset voltage, the boost open-loop topology structure 421 is in the open-loop state, and the input voltage is fixedly a preset value, such as 30 V. Therefore, the input voltage of the closed-loop topology structure 423 is 5 V. The boost open-loop topology structure 421 boosts the input voltage from 30 V to 44 V, so that an output voltage of the open-loop topology structure 422 is 1 V. It can be learned from the foregoing content that a majority of the output voltage of the power source 440 is processed by the first-type power branch with high efficiency. Therefore, the overall efficiency of the power supply circuit is relatively high. To sum up, the power supply circuit can operate with relatively high efficiency no matter whether the output voltage of the power source 440 is greater than the preset voltage or less than the preset voltage. Therefore, the power supply circuit can be applied to an application scenario requiring a broad input voltage range and high efficiency.

To sum up, in the power supply circuit provided in this embodiment, at least one first-type power branch and at least one second-type power branch are arranged in the m power branches, and the first-type power branch includes the pre-boost topology structure and the open-loop topology structure connected in series to the pre-boost topology structure. The pre-boost topology structure is connected to the control chip, and the control chip controls, based on the output voltage of the power source, the boost open-loop topology structure to switch between the straight-through state and the open-loop state. In other words, the first-type power branch can operate regardless of the output voltage of the power source. This resolves a problem of a relatively narrow input voltage range of a power supply circuit in a related technology, and supports a relatively broad input voltage range while ensuring high efficiency.

A first point that needs to be supplementary noted is that the foregoing embodiment only uses two capacitors as an example. In some embodiments, more capacitors may be included. Certainly, more power branches may be included. In addition, these power branches may be the first-type power branches, may be the second-type power branches, or may be other power branches. For example, when n=3, a third power branch may be an open-loop topology structure or a closed-loop topology structure. This is not limited herein. Furthermore, the foregoing embodiment uses only an example in which one power branch is connected in parallel to one capacitor. In one embodiment, one power branch may be connected in parallel to a plurality of capacitors of the n capacitors. This is not limited in this embodiment.

A second point that needs to be supplementary noted is that the foregoing only uses the power supply circuit including the foregoing components as an example. In some embodiments, more or fewer components may be included. This is not limited herein.

A third point that needs to be supplementary noted is that in some embodiments, locations of the first-type power branch and the second-type power branch are interchangeable. This is not limited herein.

An embodiment of this application further provides an electronic component, and the electronic component includes the power supply circuit according to the foregoing embodiments.

Figure 5:
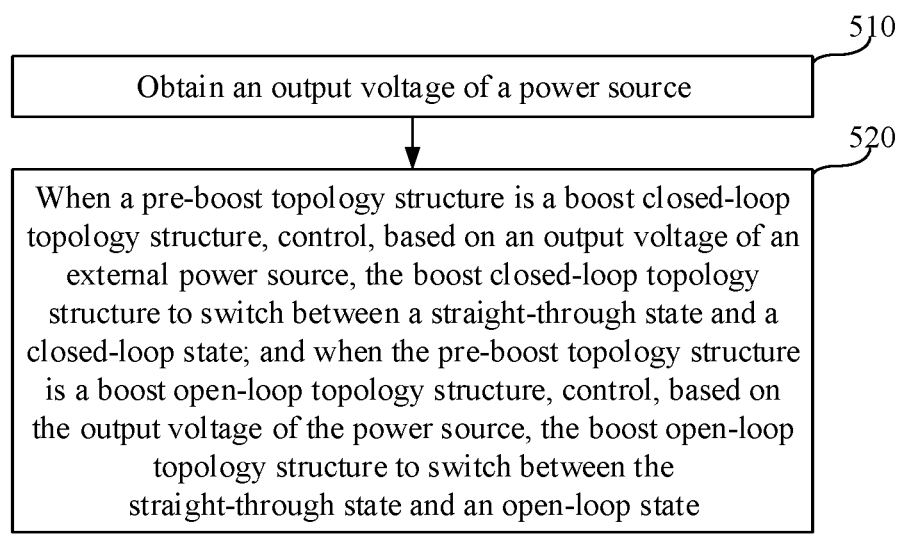
FIG. 5 is a method flowchart of a power supply control method according to an embodiment.

Referring to FIG. 5, FIG. 5 is a method flowchart of a power supply control method according to an embodiment. The power supply control method may be applied to the power supply circuit shown in FIG. 2A, FIG. 3A, or FIG. 4. As shown in FIG. 5, the method includes the following steps.

Step 510: Obtain an output voltage of a power source.

Step 520: Control, based on the output voltage of the power source, a boost closed-loop topology structure to switch between a straight-through state and a closed-loop state.

It should be noted that a power supply circuit may perform the foregoing steps by using an included control chip. In addition, in one embodiment, the method may further include:

controlling, based on the output voltage of the power source, a pre-boost topology structure to switch between a straight-through state and an open-loop state.

In one embodiment, when the pre-boost topology structure includes the straight-through state and the closed-loop state, this step includes: when the output voltage of the power source is higher than a preset voltage, controlling the pre-boost topology structure to be in the straight-through state; and when the output voltage of the power source is lower than the preset voltage, controlling the pre-boost topology structure to be in the closed-loop state.

In one embodiment, when the pre-boost topology structure includes the straight-through state and the closed-loop state, the closed-loop topology structure may alternatively be a topology structure that switches between an open-loop state and a closed-loop state. In this case, the method further includes:

when the output voltage of the power source is higher than the preset voltage, controlling the topology structure that switches between the open-loop state and the closed-loop state to be in the closed-loop state; and when the output voltage of the power source is lower than the preset voltage, controlling the topology structure that switches between the open-loop state and the closed-loop state to be in the open-loop state.

The step of controlling, based on the output voltage of the power source, a pre-boost topology structure to switch between a straight-through state and an open-loop state includes: when the output voltage of the power source is higher than the preset voltage, controlling the pre-boost topology structure to be in the straight-through state; and when the output voltage of the power source is lower than the preset voltage, controlling the pre-boost topology structure to be in the open-loop state.

For details about specific implementation of the foregoing steps, refer to the embodiment corresponding to FIG. 3A or FIG. 4. Details are not described herein in this embodiment.

To sum up, according to the power supply method provided in this embodiment, at least one first-type power branch and at least one second-type power branch are arranged in m power branches, and the first-type power branch includes the pre-boost topology structure and the open-loop topology structure connected in series to the pre-boost topology structure. The pre-boost topology structure is connected to the control chip, and the control chip controls, based on the output voltage of the power source, the pre-boost topology structure to switch between the straight-through state and the closed-loop state, so that the pre-boost topology structure pre-adjusts the output voltage of the power source and outputs the voltage range that meets a requirement of the open-loop topology structure. In other words, the first-type power branch can operate regardless of the output voltage of the power source. This resolves a problem of a relatively narrow input voltage range of a power supply circuit in a related technology, and supports a relatively broad input voltage range while ensuring high efficiency.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions.

It may be clearly understood by a person of ordinary skill in the art that, for easy and brief description, for a detailed working process of the foregoing apparatuses and units, reference may be made to a corresponding process in the foregoing method embodiments, and details are not described herein again.

In the embodiments provided herein, it should be understood that the disclosed apparatus and method may be implemented in other manners. For example, the described apparatus embodiment is merely an example. For example, the unit division may merely be logical function division and may be other division in some embodiments. For example, a plurality of units or components may be combined or integrated into another system, or some features may be ignored or may not be performed.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power supply circuit, comprising:
n capacitors, m power branches, and a control chip, wherein
the n capacitors are connected in series to a power source that supplies power to the power supply circuit, each of the m power branches is connected in parallel to at least one of the n capacitors, the m power branches comprise at least one first-type power branch and at least one second-type power branch, the first-type power branch comprises a pre-boost topology structure and an open-loop topology structure connected in series to the pre-boost topology structure, the second-type power branch comprises a closed-loop topology structure, and n and m are integers greater than or equal to 2;
the pre-boost topology structure comprises a first switching transistor and a second switching transistor, and the pre-boost topology structure comprises a straight-through state and a closed-loop state, wherein the straight-through state is a state in which the first switching transistor is closed and the second switching transistor is open so that an output voltage of the pre-boost topology structure is equal to an input voltage of the pre-boost topology structure, and the closed-loop state is a state in which duty cycles of the first switching transistor and the second switching transistor change with the output voltage of the pre-boost topology structure; and
the control chip is connected to the pre-boost topology structure, and is configured to control, based on an output voltage of the power source, the pre-boost topology structure to switch between the straight-through state and the closed-loop state, so that the pre-boost topology structure pre-adjusts the output voltage of the power source and outputs a voltage that falls within a voltage range required by the open-loop topology structure.

2. The power supply circuit according to claim 1, wherein the control chip is further configured to control, based on the output voltage of the power source, the pre-boost topology structure to switch between the straight-through state and an open-loop state, wherein the open-loop state is a state in which the first switching transistor and the second switching transistor operate at a preset duty cycle.

3. The power supply circuit according to claim 2, wherein the control chip is further configured to: when the output voltage of the power source is higher than a preset voltage, control the pre-boost topology structure to be in the straight-through state; and when the output voltage of the power source is lower than the preset voltage, control the pre-boost topology structure to be in the open-loop state.

4. The power supply circuit according to claim 3, wherein when the pre-boost topology structure is in the open-loop state, the input voltage of the pre-boost topology structure is a preset value that is greater than a first threshold and less than a second threshold, the first threshold is less than the second threshold, the first threshold is greater than or equal to ½ of a maximum output voltage of the power source, the second threshold is less than or equal to a minimum output voltage of the power source, and the minimum output voltage is greater than ½ of the maximum output voltage.

5. The power supply circuit according to claim 1, wherein the control chip is further configured to: when the output voltage of the power source is higher than a preset voltage, control the pre-boost topology structure to be in the straight-through state; and when the output voltage of the power source is lower than the preset voltage, control the pre-boost topology structure to be in the closed-loop state.

6. The power supply circuit according to claim 1, wherein when the closed-loop topology structure is a topology structure that switches between an open-loop state and a closed-loop state, the control chip is further configured to: when the output voltage of the power source is higher than a preset voltage, control the topology structure that switches between the open-loop state and the closed-loop state to be in the closed-loop state; and when the output voltage of the power source is lower than the preset voltage, control the topology structure that switches between the open-loop state and the closed-loop state to be in the open-loop state.

7. The power supply circuit according to claim 1, wherein the closed-loop topology structure is a buck topology structure.

8. An electronic component, comprising:
a power supply circuit and a power-consuming device; wherein
an input terminal of the power supply circuit is connected in parallel to a power source, and an output terminal of the power supply circuit is connected in parallel to an input terminal of the power-consuming device;
the power supply circuit includes n capacitors, m power branches, and a control chip, wherein the n capacitors are connected in series to the power source that supplies power to the power supply circuit, each of the m power branches is connected in parallel to at least one of the n capacitors, the m power branches comprise at least one first-type power branch and at least one second-type power branch, the first-type power branch comprises a pre-boost topology structure and an open-loop topology structure connected in series to the pre-boost topology structure, the second-type power branch comprises a closed-loop topology structure, and n and m are integers greater than or equal to 2;
the pre-boost topology structure comprises a first switching transistor and a second switching transistor, and a straight-through state and a closed-loop state, wherein the straight-through state is a state in which the first switching transistor is closed and the second switching transistor is open so that an output voltage of the pre-boost topology structure is equal to an input voltage of the pre-boost topology structure, and the closed-loop state is a state in which duty cycles of the first switching transistor and the second switching transistor change with the output voltage of the pre-boost topology structure; and the control chip is connected to the pre-boost topology structure, and is configured to control, based on an output voltage of the power source, the pre-boost topology structure to switch between the straight-through state and the closed-loop state, so that the pre-boost topology structure pre-adjusts the output voltage of the power source and outputs a voltage that falls within a voltage range required by the open-loop topology structure.

9. A mobile phone terminal, comprising the electronic component according to claim 8.

10. A mobile phone terminal, comprising:

a power supply circuit and a power-consuming device; wherein an input terminal of the power supply circuit is connected to a power source, and an output terminal of the power supply circuit is connected in parallel to an input terminal of the power-consuming device, wherein the power source is a battery of the mobile phone terminal;

the power supply circuit includes n capacitors, m power branches, and a control chip, wherein the n capacitors are connected in series to the power source that supplies power to the power supply circuit, each of the m power branches is connected in parallel to at least one of the n capacitors, the m power branches comprise at least one first-type power branch and at least one second-type power branch, the first-type power branch comprises a pre-boost topology structure and an open-loop topology structure connected in series to the pre-boost topology structure, the second-type power branch comprises a closed-loop topology structure, and n and m are integers greater than or equal to 2;

the pre-boost topology structure comprises a first switching transistor and a second switching transistor, and a straight-through state and a closed-loop state, wherein the straight-through state is a state in which the first switching transistor is closed and the second switching transistor is open so that an output voltage of the pre-boost topology structure is equal to an input voltage of the pre-boost topology structure, and the closed-loop state is a state in which duty cycles of the first switching transistor and the second switching transistor change with the output voltage of the pre-boost topology structure; and the control chip is connected to the pre-boost topology structure, and is configured to control, based on an output voltage of the power source, the pre-boost topology structure to switch between the straight-through state and the closed-loop state, so that the pre-boost topology structure pre-adjusts the output voltage of the power source and outputs a voltage that falls within a voltage range required by the open-loop topology structure.

* * * * *